April 8, 1969 P. F. APITZ 3,438,023

SYNCHRONOUS SWITCHING CIRCUIT FOR CONTROLLING THE FLASHING OPERATION OF A SIGNAL LIGHT

Filed May 3, 1965

INVENTOR.
PETER F. APITZ
BY Edward A. Sokolski
ATTORNEY

United States Patent Office 3,438,023
Patented Apr. 8, 1969

3,438,023

SYNCHRONOUS SWITCHING CIRCUIT FOR CONTROLLING THE FLASHING OPERATION OF A SIGNAL LIGHT

Peter F. Apitz, Placentia, Calif., assignor to Tamar Electronics Industries, Inc., Anaheim, Calif., a corporation of Delaware Filed May 3, 1965, Ser. No. 452,521
Int. Cl. G08b *5/00;* H05b *39/00, 41/00*
U.S. Cl. 340—331 8 Claims

ABSTRACT OF THE DISCLOSURE

A low frequency oscillator is synchronized with the start of a positive half cycle of the AC power line. The output of the low frequency oscillator is appropriately shaped and divided to the desired flasher frequency to provide a square wave output. The square wave signal is then used to gate a high frequency oscillator to produce modulated high frequency signals. These modulated high frequency signals are then connected to a switching circuit which provides AC power to a signal light at the desired flashing rate. The switching is synchronized at the cross-over point of the AC supply current by means of the high frequency pulses which are gated to the switching circuit by the synchronized low frequency gating signal.

Figure 1:
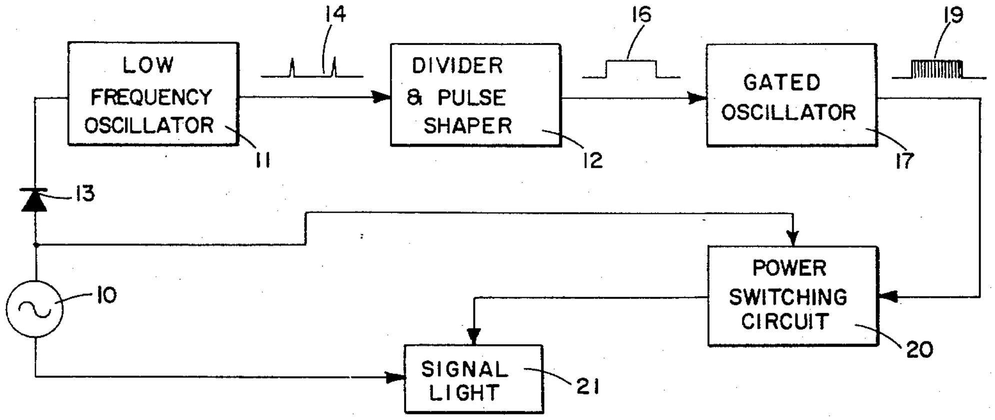

This invention relates to a solid state flasher circuit and more particularly to such a circuit suitable for use in generating a flashing light signal for use in a traffic controller.

A flasher device for generating a flashing light signal is generally an integral part of a traffic control system. Most flasher devices of the prior art are of the electromechanical variety and utilize switch contacts which are closed and opened in a cyclical fashion. Such devices of the prior art have the following disadvantages: Firstly, the moving mechanical parts involved are subject to wear and this decreases reliability of operation. Further, in some prior art devices the frequency of operation changes with variations in temperature which sometimes result in undesirable changes in the flashing intervals. A particular problem encountered with both electromechanical units of the prior art and also those which are completely electronic in their configuration is the generation of switching transient noise as the light is switched on and off. Where A-C power is utilized, the magnitude of such switching noise is dependent upon the portion of the A-C power cycle during which switching is accomplished. Thus, the greater the current at the instant of switching, the more noise is produced. Also, it has been found that the life of the signal lamps can be increased substantially if switching is accomplished at a time in the A-C cycle when the current is low. In switching devices of the prior art, the point in the A-C cycle at which switching is accomplished is not controlled and such switch-over is relatively random in nature. Under such conditions, current will as often be high at the point of switch-over as not, resulting in substantial switching transient noise and greater wear on the lamps. The disadvantage of lamp wear is obvious; the transient noise involved must generally be eliminated by the use of filters to avoid interference to other equipment such as radio apparatus which may be operating in the vicinity.

The circuit of this invention overcomes the shortcomings of prior art flasher control devices by synchronizing the switching time with the A-C line current so that switching is accomplished substantially at the point when the A-C supply current is at the zero crossover point. This minimizes switching transient noise and substantially increases lamp life. The circuit of this invention utilizes solid state elements for all switching functions and has no moving parts to wear. The semiconductor units utilized provide completely reliable operation over wide temperature ranges; further, the semiconductor circuitry is relatively compact in construction and is readily adaptable to plug-in construction.

The circuit of this invention accomplishes the desired end results by utilizing a low frequency oscillator which is synchronized with the A-C power line for generating the low frequency flasher signal. This signal is appropriately shaped and divided to the desired flasher frequency, and the resultant output is utilized to gate a high frequency oscillator. The resulting modulated high frequency signals are then utilized to switch a semiconductor switching circuit which provides the A-C power to the signal light at the desired flashing rate. The switching is unequivocally synchronized with the cross-over point of the A-C supply current by means of the high frequency pulses which are gated to the switching circuit by the synchronized low frequency gating signal.

It is therefore an object of this invention to provide an improved flasher control device.

It is a further object of this invention to minimize switching transient noise in flasher control devices.

It is a further object of this invention to increase the life of lamps utilized as flasher signals.

It is still another object of this invention to provide a flasher device having improved reliability.

It is still another object of this invention to provide a flasher control circuit using solid state elements which is of relatively compact construction and which is readily adaptable for use as a plug-in unit.

Figure 2:
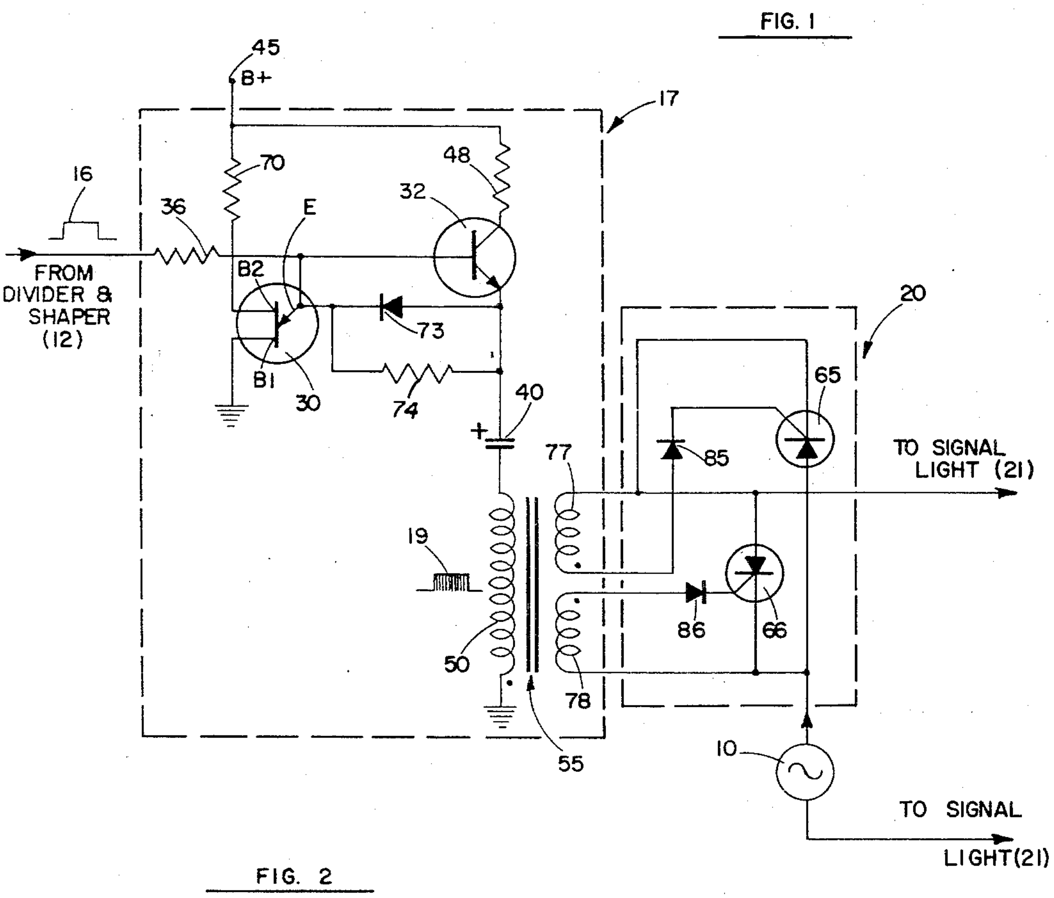

Other objects of this invention will become apparent from the following description taken in connection with the accompanying drawings, of which FIG. 1 is a block diagram of a preferred embodiment of the device of the invention, and FIG. 2 is a schematic drawing showing the gating and switching circuitry utilized in the preferred embodiment of the device of the invention.

Referring now to FIG. 1, a block diagram of a preferred embodiment of the device of the invention is shown. The positive half-cycles of A-C power source 10 are coupled through diode 13 to low frequency oscillator 11 to synchronize this oscillator with the start of a positive half-cycle of the power source. Oscillator 11 may be a relaxation oscillator having an output at a rate of the order of two pulses per second. An oscillator utilizing a unijunction transistor such as described on page 194 of the 6th edition of the "General Electric Transistor Manual," may be utilized. The output 14 of oscillator 11 is fed to divider and pulse shaper 12 which divides the frequency of the pulses down to the desired flashing frequency and produces a square wave output 16 at this frequency. A typical output signal for divider and pulse shaper 12 is a one cycle per second square wave with an on-off ratio of 1:1. Divider and pulse shaper 12 may comprise a conventional flip-flop circuit.

Low frequency signals 16 are fed to gated oscillator 17 where they are utilized to gate this oscillator. Oscillator 17, which is described in detail in connection with FIG. 2, oscillates at a relatively high frequency as compared with the gating signal 16, and typically is of the order of 2–4 kilocycles. The output 19 of gated oscillator 17 is in effect a carrier at the gated oscillator frequency having the gating signal 16 as the modulation envelope thereof. The output 19 of gated oscillator 17 is utilized to control power switching circuit 20 which may comprise silicon controlled rectifier units. Such switching units are switched on and off in accordance with the modulation envelope of control signal 19. The high frequency pulses contained by the envelope assure that the switching units are fired at the start of the A-C cycle. The high frequency pulses assure firing of the switching units right at or close to the A-C crossover point. Power switching circuit 20 connects power from A-C power source 10 to signal light 21 during the time interval that switching signal 19 is present and then cuts off such power to provide the desired flashing operation.

Referring now to FIG. 2, the details of circuitry of a preferred embodiment of gated oscillator 17 and power switching circuit 20 which may be utilized in the device of the invention is shown. Gated oscillator 17 includes unijunction transistor 30 and NPN type transistor 32, both of which are biased to cut off in the absence of an input pulse 16 from divider and shaper 12. When pulse 16 appears, it is fed through resistor 36 to the base of transistor 32, driving this transistor to the conduction state. With transistor 32 conducting, capacitor 40 is charged from B+ line 45 through resistor 48, the transistor and primary winding 50 of transformer 55. In a time period determined by the time constant of the charging circuit including resistor 48 and capacitor 40, the voltage across capacitor 40, which is applied across the emitter (E)—base number 1 (B1) junction of unijunction transistor 30, rises to a high enough level to fire the unijunction transistor. When unijunction transistor 30 fires, capacitor 40 discharges through the emitter-base number 1 junction thereof, and this provides a back bias between the emitter-base junction of transistor 32, bringing this transistor to cutoff. When the discharge current of capacitor 40 drops below the holding current required by unijunction transistor 30, this transistor goes to cut off. The discharge cycle of capacitor 40 is much shorter than the duration of pulse 16. Therefore, for each input pulse 16 there are a great number of discharge cycles of the capacitor, and at the end of the capacitor discharge cycle a pulse 16 is still present at the base of transistor 32 to again drive this transistor into conduction, thereby initiating a new cycle.

An oscillating current is thus present in primary winding 50 of transformer 55 during the entire interval that pulse 16 is present. Typical oscillating frequencies in an operative embodiment of the device of the invention are between 2 and 4 kilocycles. It is to be noted that unijunction 30 has negative resistance characteristics which make for very rapid discharge of capacitor 40, thus making for a very sharp current pulse to transformer winding 50. To further increase this discharge current it is desirable to make capacitor 40 of relatively high capacitance. Such high current pulses are used to provide the necessary power for properly firing silicon controlled rectifiers 65 and 66. The use of such pulsing signals requires less average power dissipation in the gate-cathode junctions of these silicon controlled rectifiers. It is also desirable to keep resistor 70 relatively low in value to assure that unijunction transistor 30 is unequivocally held on during the discharge cycle of capacitor 40. Diode 73 provides a low resistance discharge path for capacitor 40. Resistor 74 provides a leakage path between the emitter and base of transistor 32 which tends to prevent the transistor from spuriously going to conduction during its cutoff periods.

The oscillating current in primary winding 50 is coupled to secondary windings 77 and 78. The positive half cycles of these signals are fed through diode rectifiers 85 and 86 respectively, to the gates of silicon controlled rectifiers 65 and 66 respectively, with the other ends of the transformer windings being connected to the cathodes of the silicon controlled rectifiers. With these signals applied to the gates, silicon controlled rectifiers 65 and 66 provide a low impedance path between A-C power source 10 and signal light 21.

High current is thus made available to the signal light through the silicon controlled rectifiers during the period that signal 19 is present. In the absence of signal 19, the silicon controlled rectifiers are maintained at cut off. Thus, the signal light 21 is flashed on and off in accordance with the modulation envelope of switching signal 19. In view of the synchronization of signal 19 with the power line and the high frequency pulses contained therein, switching of silicon controlled rectifiers 65 and 66 at substantially the crossover point of the A-C current output of power source 10 is assured, even where current and voltage are not in phase due to reactive load conditions, the sharp high frequency pulses being available to fire the silicon controlled rectifiers to accommodate such phase shift. Therefore, current is at a minimum when the switchover is accomplished and the desired end results are achieved. It is to be noted that where the supply voltage and current are in phase (i.e., there is unity power factor) that the switchover occurs substantially at both the voltage and current crossover points. Where reactive loads are involved and supply voltage and current are not in phase, the switchover occurs at substantially the current crossover. Thus, the high frequency pulse synchronization assures optimum operation over a wide range of load conditions.

The following are typical component values for some of the components utilized in an operative model of the device of the invention:

| | | |
|---|---|---|
| Capacitor **40** | mfd | .1 |
| Resistor **48** | kilohms | 1.5 |
| Resistor **70** | ohms | 470 |

While the device of the invention has been described and illustrated in detail, it is to be clearly understood that this is intended by way of illustration and example only and is not to be taken by way of limitation, the spirit and scope of this invention being limited only by the terms of the following claims.

I claim:

1. A signal light, and a solid state flasher circuit for causing said signal light to flash comprising
an A-C power source,
low frequency pulse generating means, said pulse generating means being synchronously driven by the start of a positive half cycle of the output of said power source, an
gated oscillator means for generating pulses at a frequency substantially higher than that of said power source in response to the output of said pulse generating means, and
power switching means responsively connected to said gated oscillator means and interposed between said power source and said signal light for connecting said power source to said signal light,
whereby said signal light is switched on at a time when the current output of said power source is substantially zero.

2. The circuit as recited in claim 1 wherein said pulse generating means comprises a low frequency oscillator and divider and pulse shaper means for dividing the output of said oscillator to a frequency substantially lower than that of said power source and shaping the divided output to a square wave.

3. The circuit as recited in claim 1 wherein said gated oscillator means comprises a transistor, a resistor-capacitor charge circuit connected in series with said transistor, a unijunction transistor having emitter and first and second base electrodes, the emitter-first base junction of said unijunction transistor forming a discharge path for said charge circuit, and means for biasing said transistor and said unijunction transistor to cutoff, the output of said pulse generating means driving said transistor to conduction at a periodic rate.

4. In combination,
a signal light,
an A-C power source,
low frequency pulse generating means having an output frequency substantially lower than that of said power source, the output of said pulse generating means being synchronized with the start of a positive half cycle of said power source, gated oscillator means for generating pulses at a frequency substantially higher than that of said power source, said gated oscillator means being gated on in response to the output of said pulse generating means, and switch means for connecting said power source to the said signal light in response to the output pulses of said gated oscillator means, whereby said signal light is switched on when the current of said power source is substantially at zero.

5. The combination as recited in claim 4 wherein said switch means comprises a silicon controlled rectifier, said rectifier being connected between said signal light and said power source, the gate of said silicon controlled rectifier being connected to said gated oscillator means to receive said output pulses.

6. In combination, a signal light, and a solid state flasher for flashing said signal light comprising means for generating a low frequency square wave having the frequency of the desired light flashing rate, an A-C power source, the start of the positive going half cycles of said square wave being synchronized with the start of a positive half cycle of said power source output, a gated oscillator for generating pulses at a frequency substantially higher than that of said power source, said oscillator including a transistor, a resistor-capacitor charge circuit connected in series with said transistor, the positive going half cycles of said square wave being fed to the base of said transistor to drive said transistor to conduction, and a unijunction transistor, the emitter-base number one junction of said unijunction transistor providing a discharge path for the capacitor of said charge circuit, and switching means for connecting said power source to said light in response to said gated oscillator, said switching means being synchronized with the start of positive half cycles of said power source.

7. The circuit as recited in claim 6 wherein said means for generating a square wave comprises a low frequency pulse oscillator and pulse shaper means responsive to said low frequency oscillator for generating a square wave.

8. The circuit as recited in claim 6 wherein said power switching means comprises a silicon controlled rectifier.

References Cited

UNITED STATES PATENTS

| | | | |
|---|---|---|---|
| 3,114,114 | 12/1963 | Atherton et al. | 331—111 |
| 3,260,962 | 7/1966 | Draper | 331—111 |

JOHN W. CALDWELL, *Primary Examiner.*

KENNETH N. LEIMER, *Assistant Examiner.*

U.S. Cl. X.R.

307—252, 260, 284; 315—209